(No Model.)

H. B. SCHNEIDER.
TABULATING ATTACHMENT FOR TYPE WRITING MACHINES.

No. 591,789.                    Patented Oct. 12, 1897.

Witnesses:

Inventor:
Herman B. Schneider,
By Brown & Brown,
Attys.

UNITED STATES PATENT OFFICE.

HERMAN B. SCHNEIDER, OF CHICAGO, ILLINOIS, ASSIGNOR OF ONE-HALF TO HUGO C. KRAUSE, OF SAME PLACE.

TABULATING ATTACHMENT FOR TYPE-WRITING MACHINES.

SPECIFICATION forming part of Letters Patent No. 591,789, dated October 12, 1897.

Application filed October 24, 1896. Renewed August 16, 1897. Serial No. 648,448. (No model.)

*To all whom it may concern:*

Be it known that I, HERMAN B. SCHNEIDER, a resident of Chicago, in the county of Cook and State of Illinois, have invented certain new and useful Improvements in a Tabulating Attachment for Type-Writers, of which the following, when taken in connection with the drawings accompanying and forming a part hereof, is a full and complete description, sufficient to enable those skilled in the art to understand, make, and attach the same to a type-writer.

I have illustrated the machine embodying my invention attached to the top plate of a "Smith Premier" type-writer, such type-writer being so well known to the trade that no illustration of the parts thereof other than those with which my machine comes in contact is required, and thereby any misunderstanding in reference to which of the several things shown form parts of my machine or device is obviated.

The object of the invention is to obtain a machine which may be secured or attached to a type-writer and so adjusted that in tabulated work the carriage of the type-writer shall, upon the proper manipulation of the key of my machine, be released from any given position and at once stopped in position for the first figure or letter of the next column.

The invention consists, substantially, in the relative arrangement of a movable key mounted over a keyboard, with other movable parts interposed between the key and the type-writer, so that the manipulation of the key will, by means of the interposed parts, release the carriage of the type-writer to which the machine is attached, and will stop the carriage at a determined and desired point.

Figure 1:
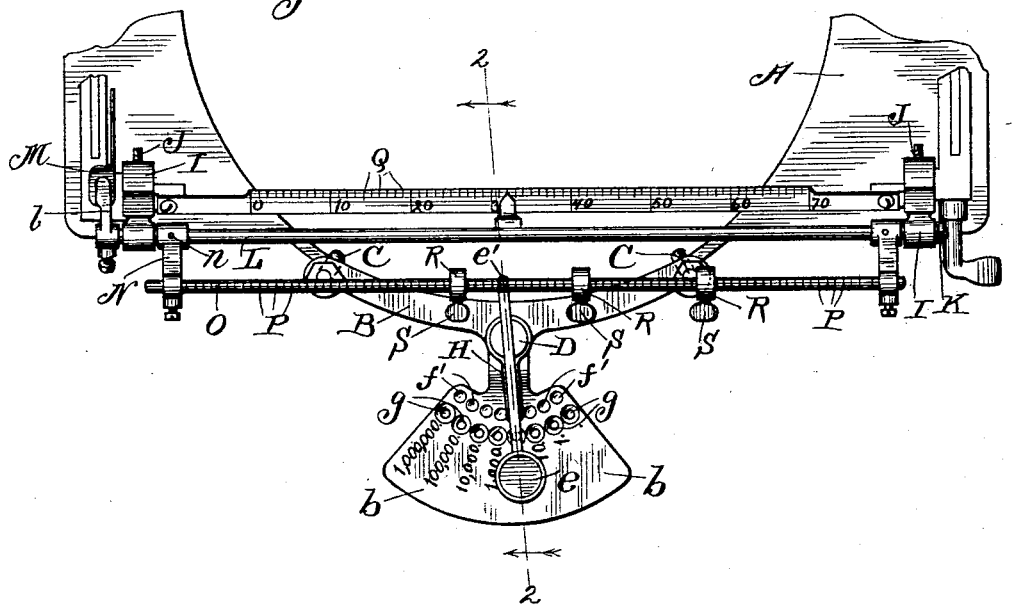
Figure 2:
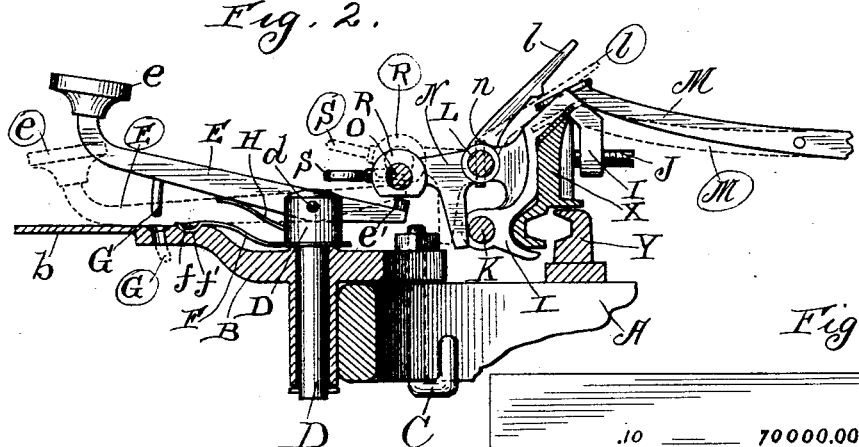
Figure 3:
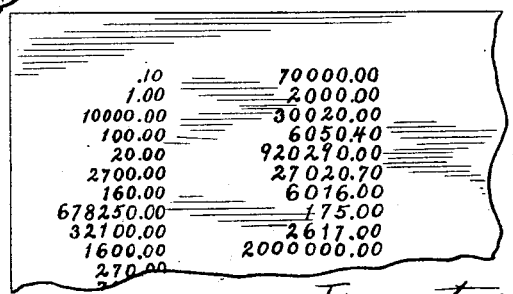

In the drawings referred to as accompanying this specification, Figure 1 is a top plan view of a portion of the top plate of a "Smith Premier" type-writer and of a machine embodying my invention attached thereto. Fig. 2 is a sectional view on line 2 2 of Fig. 1, viewed in the direction indicated by the arrows; and Fig. 3 is an elevation of a portion of a sheet of paper having tabulated work thereon done on a type-writer having my invention attached thereto.

A reference-letter applied to indicate a given part is used to designate such part throughout the several figures of the drawings wherever the same appears.

A is the top plate of a type-writer.

B is the base of a machine embodying my invention, and $b$ is the dial-plate thereof.

C is the connection by means of which base B of my machine is secured to top plate A of a type-writer.

D is a vertical spindle rotatably mounted on base B.

E is a key-lever pivotally mounted on the upper end of spindle D, by means of the pivot $d$ extending through such spindle D and key-lever E.

$e$ is the key on key-lever E, by means of which such key-lever is properly adjusted in a horizontal plane and depressed in a vertical plane.

$e'$ is a lug or projection on the inner end of key-lever E.

F is a spring mounted on post D to turn therewith, and having part $f$ pressed outward from the body thereof to fit into the several depressions $f'$ $f'$, corresponding therewith in plate $b$ of base B.

G is a pin or lug on under side of key-lever E, such pin or lug fitting into the several holes $g$ $g$ in plate $b$ when such key-lever is depressed. The purpose of the spring F, part $f$, and depressions $f'$ $f'$ is to enable a person operating the key $e$ to readily stop the key-lever E at a proper place, so that the pin G will enter the desired one of the holes $g$ $g$.

H is a spring one end whereof is secured in post or spindle D and the other end whereof abuts against key-lever E, yieldingly holding the key-lever in a position with key $e$ raised and lug $e'$ depressed.

X is the front bar of the type-writer carriage, and Y is a rail on the top-plate A of the type-writer, between which and bar X balls are interposed in the "Smith Premier" type-writer.

I I are end or side-pieces forming part of the apparatus embodying my invention secured to the type-writer carriage by set-screws J J, respectively, and to each other by rod or bar K.

L is a rod journaled in end pieces I I, and $l$ is an arm rigidly secured on one end of rod L, so as to engage when depressed with the ordinary release-key M of the type-writer.

N N are arms rigidly secured, as by pins n n, to the rod L, and O is a rod secured in arms N N and having thereon gradations P P, corresponding with the gradations on the ordinary carriage-scale Q. When rod O is raised, as by the depressing of key e and consequent raising of the end of key-lever E, having lug e' thereon, the arm l is depressed and thereby the release-key M of the type-writer carriage is actuated to release the type-writer carriage, which will then be moved to the left, as viewed from the front of the type-writer machine, by the type-writer-carriage spring. To determine the amount of such movement and the place of stopping of the carriage, I place the sleeves R R on rod O to come in contact with lug e' on lever E with set-screws S S, by which such sleeves may be secured in an adjusted position relative to the marks P P. Sleeves R R R may be said to represent or indicate, respectively, columns of figures or letters, as when key e is depressed and rod O thereby raised, thus depressing arm l and releasing the type-writer carriage, such carriage will move to the left until the sleeve R on rod O, which is adjacent to lug e' to the right-hand side thereof, is brought into contact with such lug e', and the particular place in each column of figures (with reference to units, tens, hundreds, and so on) at which the carriage is to be stopped is determined by the position of the key e relative to the holes g g in plate b—that is, by the one of such holes into which lug G is thrust by the depression of key e and the end of key-lever E, on which key e is mounted.

The manner of operation of the machine embodying my invention is: Having adjusted as many of the sleeves R R R on rod O as there are to be columns of figures (or letters) in proper position and having secured such sleeves in proper position by set-screws S S, respectively, let it be assumed that the two columns of figures illustrated in Fig. 3 are to be type-written. The sheet or sheets of paper on which the columns are to be type-written are placed in the type-writer roller or carriage in the ordinary way. The key e is then swung over the dial-plate b (pivot or spindle D turning in base B) until lug G is over the hole at the extreme right-hand side of such dial, as viewed in Fig. 1, and the key e is depressed so as to force such lug G into such hole g., (having the mark of a period thereto.) Rod O is thereby raised, together with arms N N, rod L is rocked in its journal-bearings in end pieces I I, and arm l is thereby depressed, thus releasing the type-writer carriage, which will move to the left until the stop which was adjacent to the lug e' and on the right-hand side thereof is brought into contact with the lug e' and thereby stopped, (together with the type-writer carriage on which the side pieces I I are secured, as hereinbefore described.) The type-writer key for impressing the period is then depressed in the usual way, as are also, in rotation, the keys for impressing the figures "1" and zero. The key e is then moved laterally on dial b, so that the lug G is over the hole g having "10,000" set thereto and depressed. The adjacent sleeve R will thereby be brought into contact with the lug e'. The "7" key of the type-writer is then actuated, followed by the actuation of the zero type-writer key four times, the key for the period once, and again the zero-key two times. The type-writer carriage is then reset for the next line. Key e is then moved over dial b, so that the lug G will be over the hole g having "1" thereto and depressed. The type-writer carriage will be thereby (in the manner hereinbefore described) set in proper place to actuate the "1" type-writer key, and such actuation of the "1" key is folloyed by the actuation of the period (.) key and two actuations of the zero-key. Next the key e is placed on dial b, so that depression thereof will force lug G into the hole g indicated by "1,000" and depressed, and thereafter "2,000.00" is written or printed on the type-writer in the usual way. The carriage is then reset for a new line and key e turned and depressed with lug G in the hole g indicated by "10,000" and the type-writer actuated to write or print "10,000.00" in the usual way, after which key e is depressed with lug G in the hole g indicated by "10,000" and "30,020.00" printed or written on the type-writer. In like manner the entire column is printed or written—that is, the key e is moved on the dial b so that lug G on key-lever E is over the one of the holes g g which is indicated by the numbers corresponding with the denomination of the first figure or mark in the column for which the type-writer carriage is set by the contact of the adjacent sleeve O (to the right-hand side thereof) with lug e' on key-lever E when key e is depressed.

Having thus described my invention, what I claim as new, and desire to secure by Letters Patent, is—

1. In a tabulating attachment for type-writers the combination of a base, means for attaching the base to a type-writer, a rotatable spindle mounted in the base, a key-lever pivoted in the spindle, such key-lever having a key on one end thereof and a lug on the other end, registering holes and a lug fitting thereinto on the base and key-lever respectively, with an arm mounted on the type-writer carriage to press upon and actuate the release-key of the type-writer carriage when depressed, and a connection between such arm and the pivoted key-lever whereby when the key is depressed the arm is thereby depressed.

2. In a tabulating attachment for type-writers the combination of a rotatable spindle, means for attaching the rotatable spindle to a type-writer, a key-lever having a key on one end thereof and a lug on the other end, mounted on the rotatable spindle, means for registering the key-lever, an arm mounted on the type-writer carriage to press upon and actuate the release-key of the type-writer carriage when depressed, and a connection between such arm and the pivoted key-lever, whereby when the key is depressed the arm is thereby depressed.

3. The combination with the keys of a type-writer of a rotatable spindle, an additional key-lever pivotally mounted on the rotatable spindle, means for registering the rotary movement of the key-lever and spindle, adjustable stops mounted on the type-writer carriage and arranged to be successively carried thereby into contact with the key-lever, and a connection between the key-lever and the release-key of the type-writer carriage; substantially as described.

4. In a tabulating attachment for type-writers a frame arranged to be attached to a type-writer carriage, arms pivotally secured in the frame, a rod connecting the arms, attachable stops on the rod and an arm connected to the first-named arms to move therewith and to the release-key of the type-writer carriage to actuate it, in combination with a horizontally and vertically movable key; substantially as described.

5. In a tabulating attachment for type-writers a frame arranged to be attached to a type-writer carriage, arms pivotally secured in the frame, a rod connecting the arms, attachable stops on the rod and an arm connected to the first-named arms to move therewith and to the release-key of the type-writer carriage to actuate it, in combination with a horizontally and vertically movable key with means for determining a horizontal movement of the key; substantially as described.

6. In a type-writer attachment a horizontally and vertically movable key, means for determining the horizontal position of the key, and a connection between such key and the type-writer carriage whereby the carriage is released and the movement of the carriage is arrested by the actuation of the key at a place determined by the horizontal position of the key; substantially as described.

7. In a type-writer spacing attachment a horizontally and vertically movable key-lever moving horizontally to correspond with letter-spaces of the type-writer and a connection between such key-lever and the type-writer carriage to release the carriage and arrest it by such key-lever; substantially as described.

HERMAN B. SCHNEIDER.

Witnesses:
CHARLES T. BROWN,
M. B. LAWRENCE.